US012442981B2

(12) United States Patent
Ling et al.

(10) Patent No.: US 12,442,981 B2
(45) Date of Patent: Oct. 14, 2025

(54) DOUBLE-LAYERED ANTISYMMETRIC TWO MODE BRAGG GRATINGS

(71) Applicant: Cisco Technology, Inc., San Jose, CA (US)

(72) Inventors: Tao Ling, Breinigsville, PA (US); Ravi S. Tummidi, Breinigsville, PA (US); Shiyi Chen, Breinigsville, PA (US)

(73) Assignee: Cisco Technology, Inc., San Jose, CA (US)

( * ) Notice: Subject to any disclaimer, the term of this patent is extended or adjusted under 35 U.S.C. 154(b) by 54 days.

(21) Appl. No.: 18/168,366

(22) Filed: Feb. 13, 2023

(65) Prior Publication Data
US 2024/0272363 A1   Aug. 15, 2024

(51) Int. Cl.
*G02B 6/293*   (2006.01)
*G02B 6/12*   (2006.01)
*G02B 6/124*   (2006.01)

(52) U.S. Cl.
CPC ......... *G02B 6/29328* (2013.01); *G02B 6/124* (2013.01); *G02B 6/29389* (2013.01); *G02B 6/12007* (2013.01); *G02B 2006/12107* (2013.01)

(58) Field of Classification Search
CPC ............... G02F 1/225; G02F 2201/307; G02B 6/29328; G02B 6/29389; G02B 6/12007; G02B 6/124; G02B 2006/12107
See application file for complete search history.

(56) References Cited

U.S. PATENT DOCUMENTS

| 4,484,797 | A  | * | 11/1984 | Knop | B42D 25/425 |
| | | | | | 359/569 |
| 7,782,509 | B2 | * | 8/2010 | Walter | B42D 25/45 |
| | | | | | 359/2 |
| 8,165,437 | B2 | * | 4/2012 | Pyo | G02B 6/124 |
| | | | | | 385/37 |
| 9,823,418 | B2 | * | 11/2017 | Okayama | G02B 6/29325 |
| 10,466,100 | B2 | * | 11/2019 | Cho | G01J 3/021 |
| 10,862,269 | B2 | * | 12/2020 | Pogrebnyak | H01S 5/1092 |
| 10,983,275 | B2 | * | 4/2021 | Popovic | H01L 27/1203 |
| 11,002,980 | B1 | * | 5/2021 | Ling | G02B 5/1861 |
| 11,249,246 | B2 | | 2/2022 | Ling et al. | |
| 11,579,364 | B2 | * | 2/2023 | Colburn | H01L 21/3212 |

(Continued)

OTHER PUBLICATIONS

Li Xu, Jia Ge, Jay H. Patel, and Mable P. Fok, "Dual-layer orthogonal fiber Bragg grating mesh based soft sensor for 3-dimensional shape sensing," Opt. Express 25, 24727-24734 (2017) (Year: 2017).*

(Continued)

*Primary Examiner* — Thomas A Hollweg
*Assistant Examiner* — Erin D Chiem
(74) *Attorney, Agent, or Firm* — Patterson + Sheridan, LLP

(57) ABSTRACT

Embodiments herein describe a dual-layer Bragg grating that can be used as a dual-bandpass filter. In one embodiment, the dual-layer Bragg grating comprises at least two layers, each having an anti-symmetrical structure. In addition, the anti-symmetrical structures can have different pitches which are tuned to different bands. That is, the pitch of the anti-symmetrical structure in one layer can be set to reflect a first band in a received optical signal while the pitch of the anti-symmetrical structure in the other layer is set to reflect a second band in the received optical signal.

20 Claims, 7 Drawing Sheets

(56) References Cited

U.S. PATENT DOCUMENTS

| | | | | |
|---|---|---|---|---|
| 11,693,182 B2* | 7/2023 | Wang | | G02B 6/124 |
| | | | | 385/37 |
| 2002/0041734 A1* | 4/2002 | Worchesky | | G02B 6/12007 |
| | | | | 385/24 |
| 2004/0037503 A1* | 2/2004 | Hastings | | G02B 6/124 |
| | | | | 385/37 |
| 2004/0258358 A1* | 12/2004 | Duguay | | G02B 6/122 |
| | | | | 385/39 |
| 2005/0170259 A1* | 8/2005 | Holmes | | G03H 1/0244 |
| | | | | 430/1 |
| 2007/0263973 A1* | 11/2007 | Van Laere | | G02B 6/305 |
| | | | | 385/129 |
| 2007/0279745 A1* | 12/2007 | Klemann | | G02B 5/1847 |
| | | | | 359/566 |
| 2008/0193084 A1* | 8/2008 | Accard | | G02B 6/124 |
| | | | | 385/37 |
| 2010/0329608 A1 | 12/2010 | Ogawa et al. | | |
| 2011/0053095 A1* | 3/2011 | Sakuma | | G02B 6/124 |
| | | | | 430/321 |
| 2015/0333482 A1* | 11/2015 | Briggs | | H01S 5/125 |
| | | | | 372/45.01 |
| 2017/0059779 A1 | 3/2017 | Okayama | | |
| 2018/0088275 A1* | 3/2018 | Okayama | | G02B 6/12007 |
| 2018/0329207 A1* | 11/2018 | Sitter | | G02B 5/0215 |
| 2020/0295422 A1 | 9/2020 | Puckett et al. | | |
| 2020/0341200 A1* | 10/2020 | Van Vaerenbergh | | G02B 6/124 |
| 2021/0109281 A1 | 4/2021 | Ling et al. | | |

OTHER PUBLICATIONS

Madsen, C. K., et al. "Planar waveguide add/drop filter employing a mode-converting grating in an adiabatic coupler." Integrated Photonics Research. Optical Society of America, 1998 [Abstract Only].

Castro, Jose M., et al. "Optical add-drop multiplexers based on the antisymmetric waveguide Bragg grating." Applied optics 45.6 (2006): 1236-1243. [Abstract Only].

Qiu, H. et al. Silicon band-rejection and band-pass filter based on asymmetric Bragg sidewall gratings in a multimode waveguide. Opt. Lett. 41, 2450-2453 (2016). [Abstract Only].

Y.-B. Cho, B.-K. Yang, J.-H. Lee, J.-B. Yoon and S.-Y. Shin, "Silicon Photonic Wire Filter Using Asymmetric Sidewall Long-Period Waveguide Grating in a Two-Mode Waveguide," in IEEE Photonics Technology Letters, vol. 20, No. 7, pp. 520-522, Apr. 1, 2008, doi: 10.1109/LPT.2008.918895. [Abstract Only].

* cited by examiner

DOUBLE-LAYERED ANTISYMMETRIC TWO MODE BRAGG GRATINGS

TECHNICAL FIELD

Embodiments presented in this disclosure generally relate to Bragg gratings (or Bragg filters) having two layers with anti-symmetric structures.

BACKGROUND

An on-chip integrated optical multiplexer/demultiplexer (mux/demux) is an element in a Coarse Wavelength Division Multiplexing (CWDM4) based optical transceiver module. Moreover, the low loss offered by an on-chip integrated optical mux/demux is preferred in low power optical communication systems. Additionally, an optical mux/demux with flat-top passband can eliminate the temperature control on the laser and reduce the total power of the system.

One element in an optical mux/demux is a dual-bandpass filter. Single-layered silicon (Si) based Bragg gratings can be used as dual-channel bandpass filters due to their high effective index difference between the fundamental mode and the first order mode. However, it is hard to achieve a single-layered dual-channel bandpass filter (where two wavelengths/bands are reflected but two bands pass through) in other types of optical materials such as a silicon nitride (SiN) photonic platform, because a lack of a suitable effective index difference between the fundamental mode and the first order mode.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

One embodiment presented in this disclosure is a Bragg grating that includes a first layer including a first anti-symmetrical structure with a first pitch and a second layer including a second anti-symmetrical structure with a second pitch that is different than the first pitch.

Another embodiment presented in this disclosure is a photonic chip that includes a first layer including a first anti-symmetrical structure with a first pitch, and a second layer including a second anti-symmetrical structure partially overlapping the first layer. Moreover, the second layer has a second pitch that is different than the first pitch, and the first and second layers are tuned to reflect different bands contained in an optical signal.

Another embodiment presented in this disclosure is a passband filter that includes an input configured to receive an optical signal including at least three bands, a dual-layer Bragg grating configured to receive the optical signal and reflect at least two of the at least three bands and permit at least one of the at least three bands to pass through, an optical coupler disposed between the input and the dual-layer Bragg grating where the optical coupler configured to redirect the reflected bands to a first output of the passband filter, and a second output configured to output the at least one band that passed through the dual-layer Bragg grating.

EXAMPLE EMBODIMENTS

Embodiments herein describe a dual-layer Bragg grating that can be used as a dual-bandpass filter. The dual-layer Bragg grating can be implemented using a material (e.g., silicon nitride (SiN)) that lacks a suitable effective index difference between the fundamental mode and the first order mode to form a dual-bandpass filter using a single layer Bragg grating. However, the dual-layer Bragg grating can also be implemented using materials such as silicon (Si) that do have an effective index difference between the fundamental mode and the first order mode to form a dual-bandpass filter using a single layer Bragg grating. For example, there may be advantages of using a dual-layer Bragg grating relative to a single-layer Bragg grating, regardless of the material used.

Figure 2A:
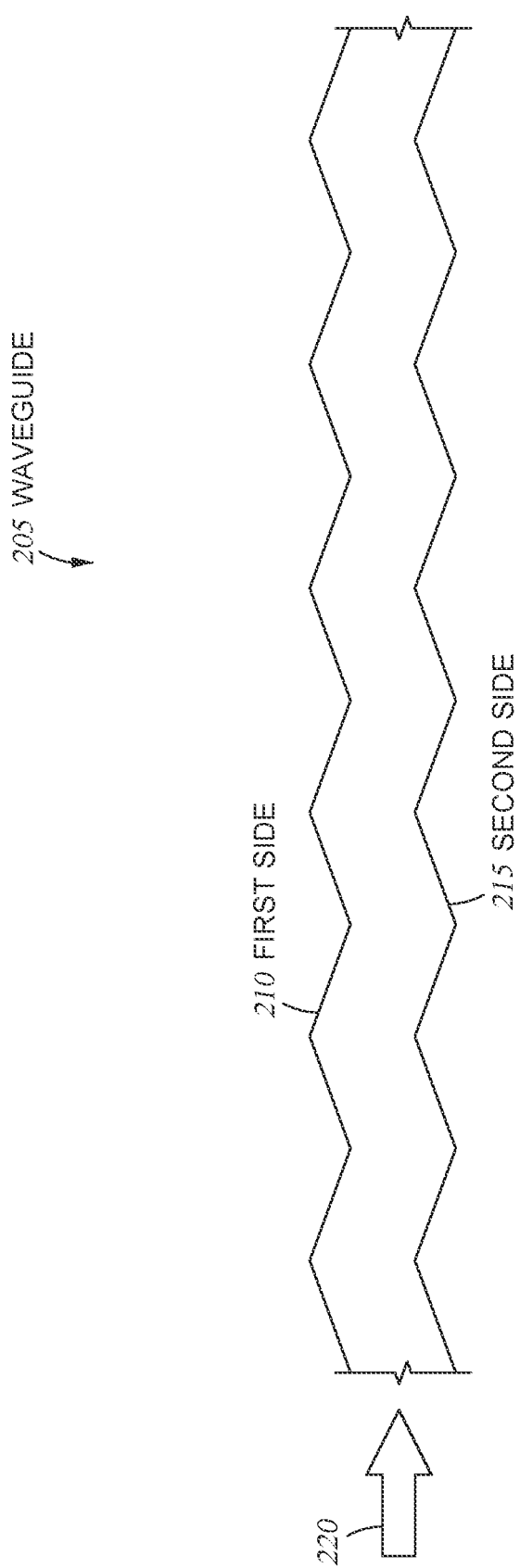
FIGS. 2A-2C illustrate anti-symmetric structures that can be used in Bragg gratings, according to several embodiments.
Figure 2B:
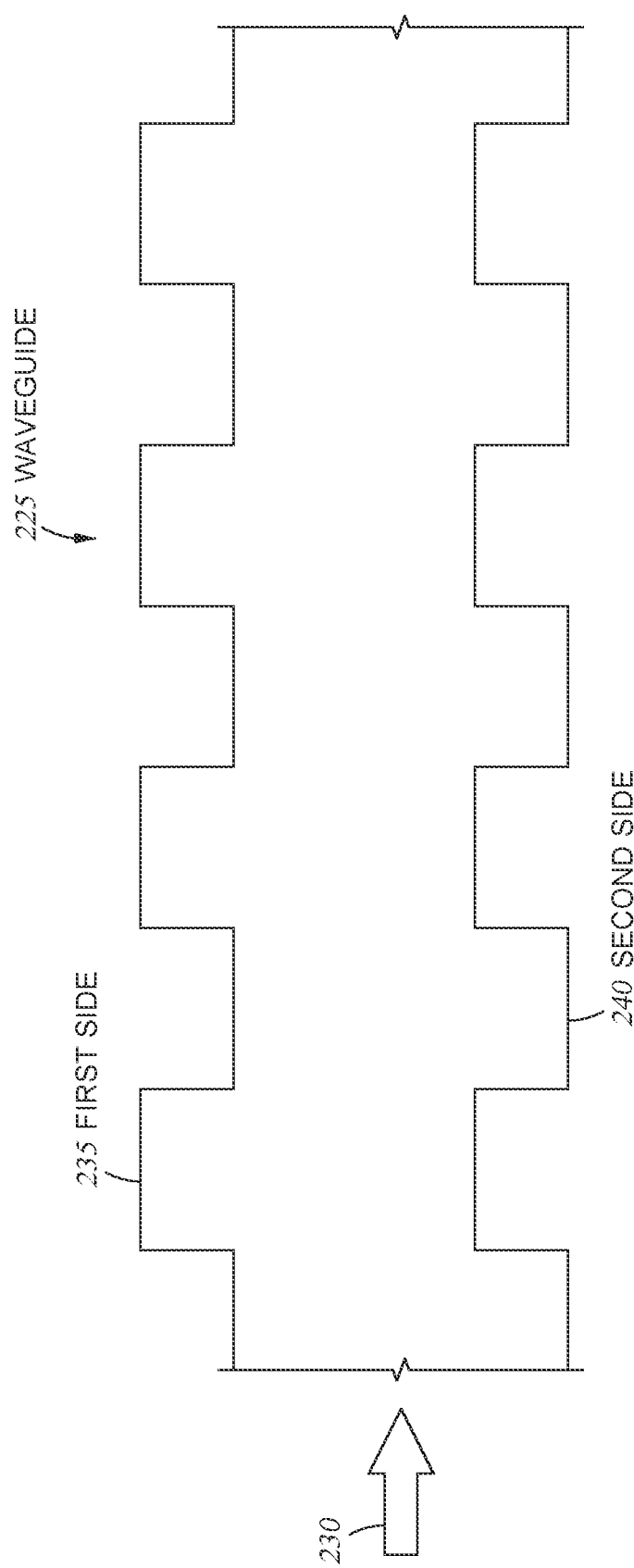
Figure 2C:
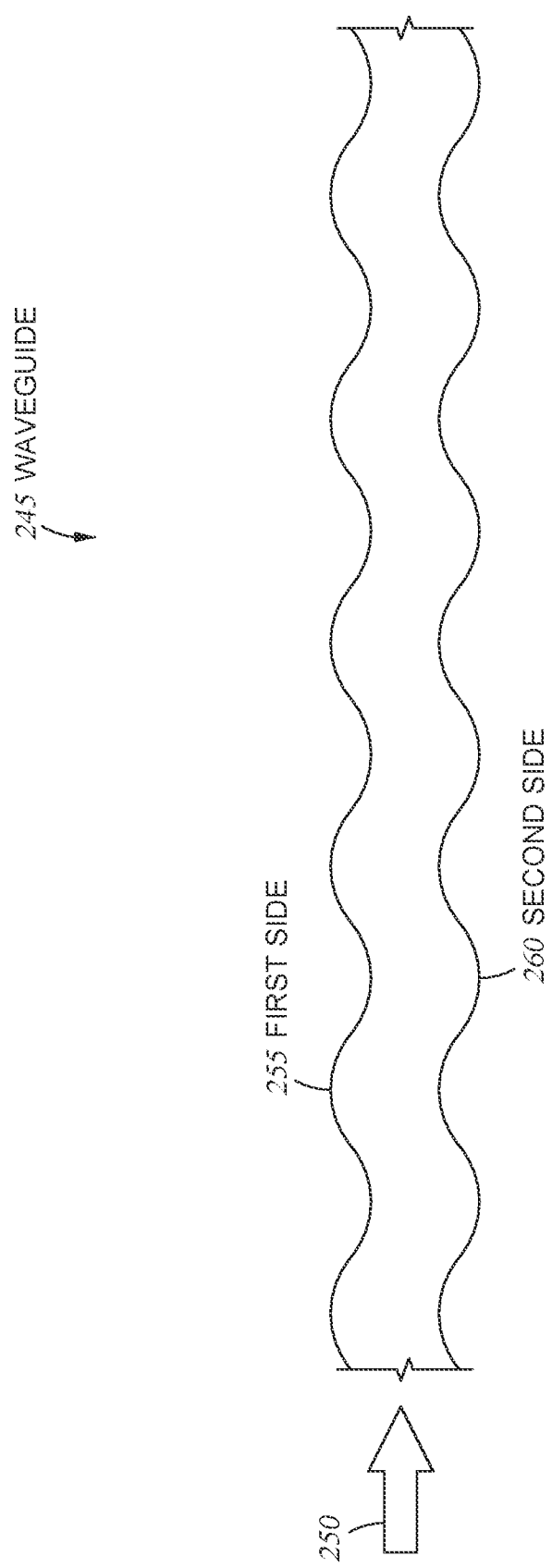

In one embodiment, the dual-layer Bragg grating comprises two layers, each having an anti-symmetrical structure. Various shapes of suitable anti-symmetrical structures are shown in FIGS. 2A-2C below. In addition, the anti-symmetrical structures can have different pitches which are tuned to different bands. That is, the pitch of the anti-symmetrical structure in one layer can be set to reflect a first band in a received optical signal while the pitch of the anti-symmetrical structure in the other layer is set to reflect a second band in the received optical signal. In this manner, the dual-layer Bragg grating can be used to selectively reflect two bands in a received optical signal.

In one embodiment, the bands that are reflected by the dual-layer Bragg grating are not contiguous. That is, the reflected bands have one or more other bands between them (i.e., noncontiguous bands). For example, if the received optical signal includes four bands (e.g., Bands 1-4), the dual-layer Bragg grating may reflect Bands 1 and 3 but permit Bands 2 and 4 to pass through, or the grating may reflect Bands 2 and 4 but permit Bands 1 and 3 to pass through.

Figure 1:
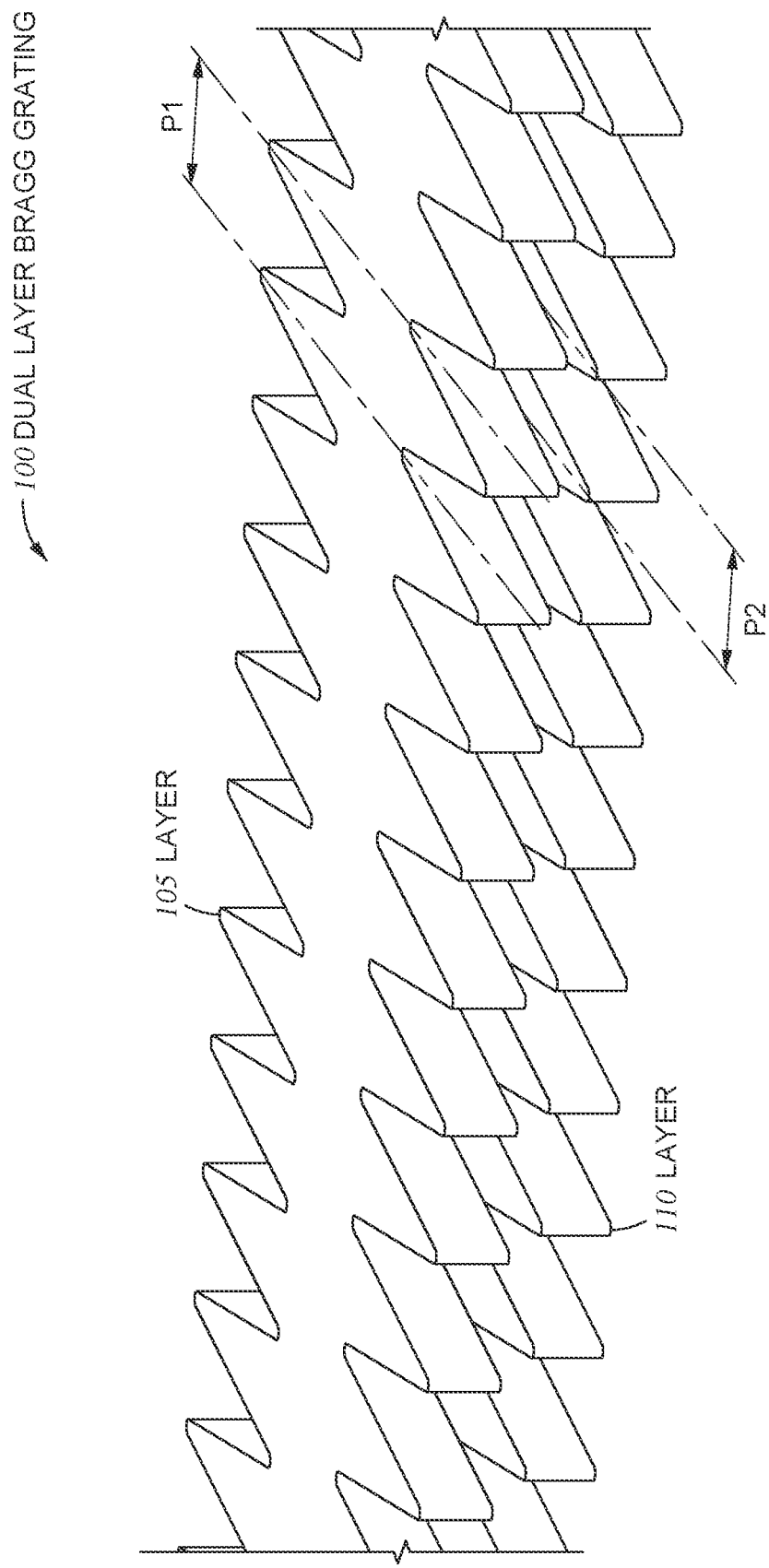
FIG. 1 illustrates a dual-layer Bragg grating, according to one embodiment.

FIG. 1 is a plan view of a dual-layer Bragg grating 100, according to one embodiment. The grating 100 includes two layers 105 and 110. In one embodiment, both the layers are formed using SiN. Many manufactures of optical devices prefer silicon nitride (SiN) waveguides because of relaxed fabrication tolerances and a lower optical loss than Si waveguides. However, the layers 105 and 110 may also be made from Si. In any case, the dual-layer Bragg grating 100 can be used as a dual-passband filter that reflects multiple bands in a received optical signal. That is, the Bragg grating 100 can reflect two different bands in the received optical signal, which have different wavelengths or frequencies.

To do so, both of the layers 105 and 110 include anti-symmetric structures along the direction of propagation of the optical signal in the grating 100 (e.g., from right to left or from left to right). Different examples of anti-symmetrical structures will be discussed in FIGS. 2A-2C. In general, an anti-symmetrical structure means, when moving in the direction or propagation, if a first side of the structure has a peak then the second side of the structure has a valley, and if the first side of the structure has a valley then the second side has a peak. In contrast, in a symmetrical structure, when moving in the direction or propagation, if a first side of the structure has a peak then the second side of the structure also has a peak, and if the first side of the structure has a valley the second side also has a valley. In FIG. 1, the anti-symmetrical structures of the two layers 105 and 110 are the same pattern (e.g., a sinusoid), but they can be different—e.g., a sinusoid pattern in layer 105 and a saw tooth pattern in layer 110.

FIG. 1 also illustrates the pitch of the anti-symmetrical structures in the layers 105, 110. In this example, the pitch of the anti-symmetrical structure for layer 105 is labeled as P1 and the pitch of the anti-symmetrical structure for layer 110 is labeled as P2. The pitches P1 and P2 extend between peaks in the respective layers 105 and 110.

In order to reflect two different bands, the pitches of the anti-symmetrical structures in the layers 105, 110 are different. That is, pitch P1 of the layer 105 may be larger (or smaller) than pitch P2 of the layer 110. As such, the layer 105 reflects a different band in a received optical signal than the layer 110. That is, the mode of the optical signal may travel in both of the layers 105 and 110, but the layer 105 may reflect Band 1 while the layer 110 reflects Band 2. Thus, the pitches of the layers can be set at a distance to reflect a particular band.

As an example, if the dual-layer Bragg grating 100 is used in a CWDM mux/demux, the layers 105, 110 may be tuned to reflect two bands that are within the range of 1271-1331 nm. Currently, CWDM4 includes four lanes or bands where lane 0 (L0) has a center wavelength of 1271 nm with a wavelength range of 1264.5 to 1277.5 nm, L1 has a center wavelength of 1291 nm with a wavelength range of 1284.5 to 1297.5 nm, L2 has a center wavelength of 1311 nm with a wavelength range of 1304.5 to 1317.5 nm, and L3 has a center wavelength of 1331 nm with a wavelength range of 1324.5 to 1337.5 nm. As an example, the pitches of the layers 105 and 110 in the dual-layer Bragg grating 100 can be set to reflect L0 and L2 (or reflect L1 and L3). However, CWDM4 is just one example where the dual-layer Bragg grating 100 can be used to reflect different bands in a received optical signal. That is, the dual-layer Bragg grating 100 is not limited to a particular wavelength range of optical signals.

In one embodiment, a thin material separates the layers 105 and 110. For example, the silicon nitride (SiN) or silicon (Si) layers forming the layers 105 and 110 may be separated by a oxide layer (not shown in FIG. 1) with a thickness that can vary from a few tens of nanometers to a few hundred nanometers. The oxide can be a lower index layer than the layers 105 and 110. Although in other embodiments, the layers 105 and 110 may directly contact.

In one embodiment, the thickness of the layers 105 and 110 may range from 200-500 nm.

In one embodiment, the dual-layer Bragg grating 100 has a flat top. That is, other types of Bragg gratings create a pattern in the Z direction of the grating by etching (or removing) material. However, the Bragg grating 100 is a flat top where no etching is performed in the Z direction to form the anti-symmetrical structures. Instead, the anti-symmetric structures are formed by etching or removing material in the X and Y directions. This may be advantageous since it may simplify the fabrication process of the anti-symmetrical structures in the layers 105 and 110.

Figure 4:
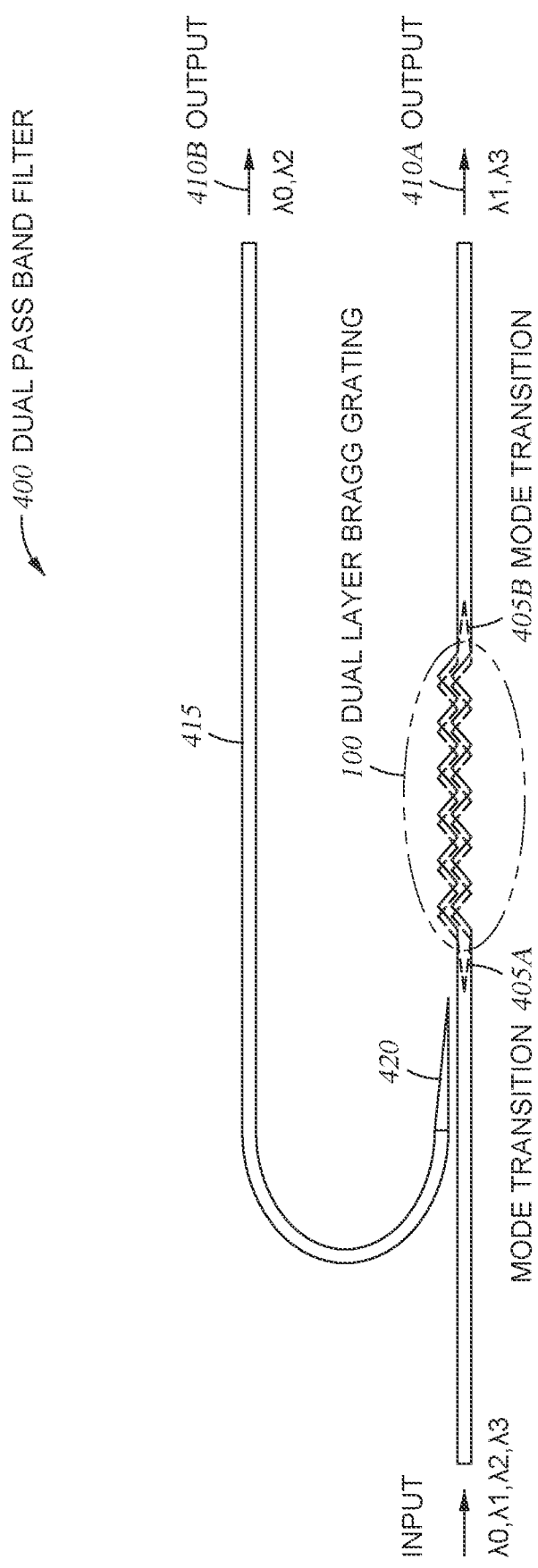
FIG. 4 illustrates filtering two passbands using a dual-layer Bragg grating, according to one embodiment.
Figure 5:
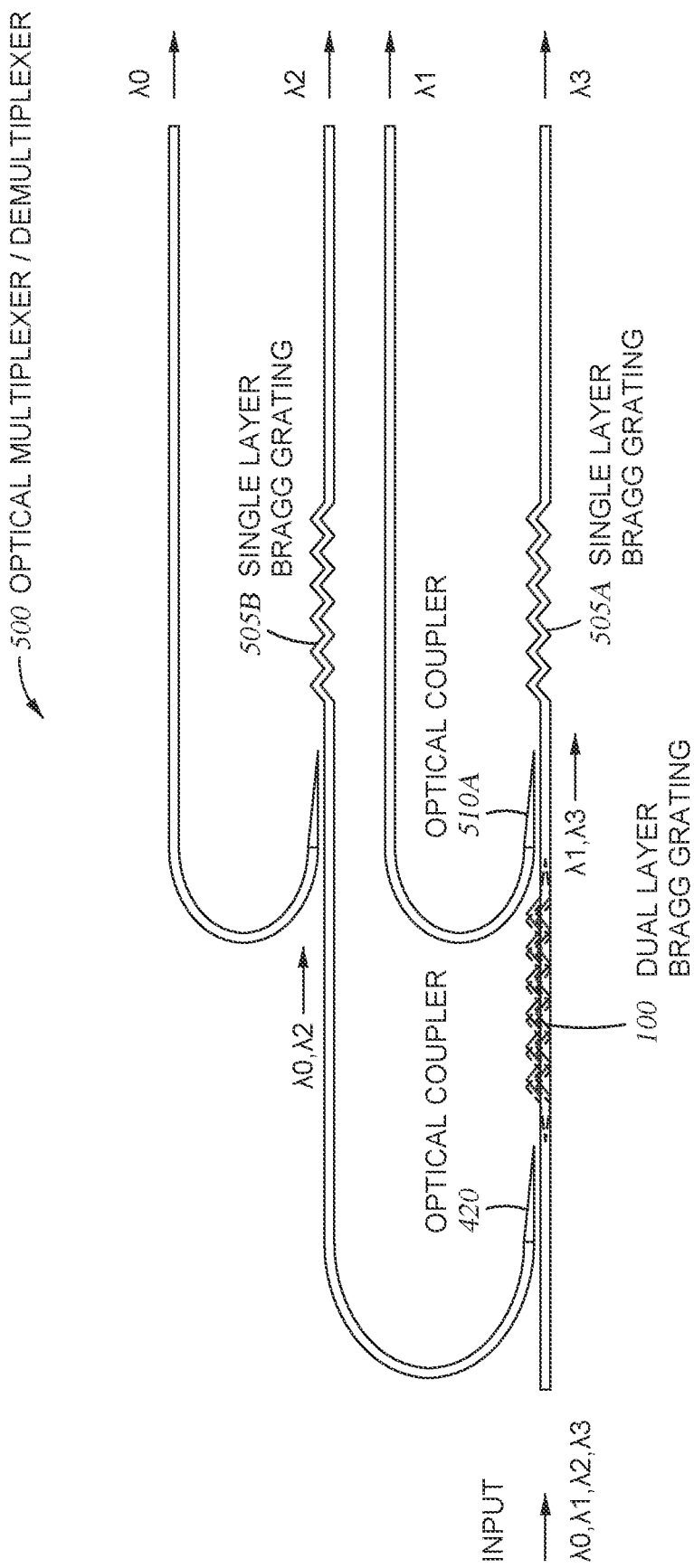
FIG. 5 illustrates an optical mux/demux that includes at least one dual-layer Bragg grating, according to one embodiment.

In one embodiment, the Bragg grating 100 is implemented in a photonic chip (e.g., a semiconductor chip). The photonic chip can include waveguides that couple the Bragg grating 100 to other optical devices in the photonic chip. For example, the Bragg grating 100 may be part of a passband filter (which is illustrated in FIG. 4) or an optical mux/demux (which is illustrated in FIG. 5) that are also implemented in the photonic chip.

FIGS. 2A-2C illustrate anti-symmetric structures that can be used in Bragg gratings, according to several embodiments. That is, FIGS. 2A-2C illustrate different anti-symmetric structures that can be used to form the layers 105 and 110 in the Bragg grating 100 in FIG. 1. FIG. 2A illustrates a waveguide 205 that can be used to form one of the layers in a dual-layer Bragg grating. FIG. 2A illustrates a top view of the waveguide 205. Further, the waveguide 205 forms a zig-zag shape that is anti-symmetrical. Relative to a direction of propagation indicated by the arrow 220, when a first side 210 of the waveguide 205 is at a peak (e.g., extends in the furthest direction towards the top of the page), the second side 215 is at a valley. Conversely, when the second side 215 is at a peak (e.g., extends in the furthest direction towards the bottom of the page), the first side 210 is at a valley.

FIG. 2B illustrates a waveguide 225 that can be used to form one of the layers in a dual-layer Bragg grating. FIG. 2B illustrates a top view of the waveguide 225. The waveguide 225 forms a saw tooth shape that is anti-symmetrical. Relative to a direction of propagation indicated by the arrow 230, when a first side 235 of the waveguide 225 is at a peak (e.g., extends in the furthest direction towards the top of the page), a second side 240 is at a valley. Conversely, when the second side 240 is at a peak (e.g., extends in the furthest direction towards the bottom of the page), the first side 235 is at a valley.

FIG. 2C illustrates a waveguide 245 that can be used to form one of the layers in a dual-layer Bragg grating. FIG. 2C illustrates a top view of the waveguide 245. The waveguide 245 forms a sinusoid shape that is anti-symmetrical. Relative to a direction of propagation indicated by the arrow 250, when a first side 255 of the waveguide 245 is at a peak (e.g., extends in the furthest direction towards the top of the page), a second side 260 is at a valley. Conversely, when the second side 260 is at a peak (e.g., extends in the furthest direction towards the bottom of the page), the first side 255 is at a valley.

Figure 3:
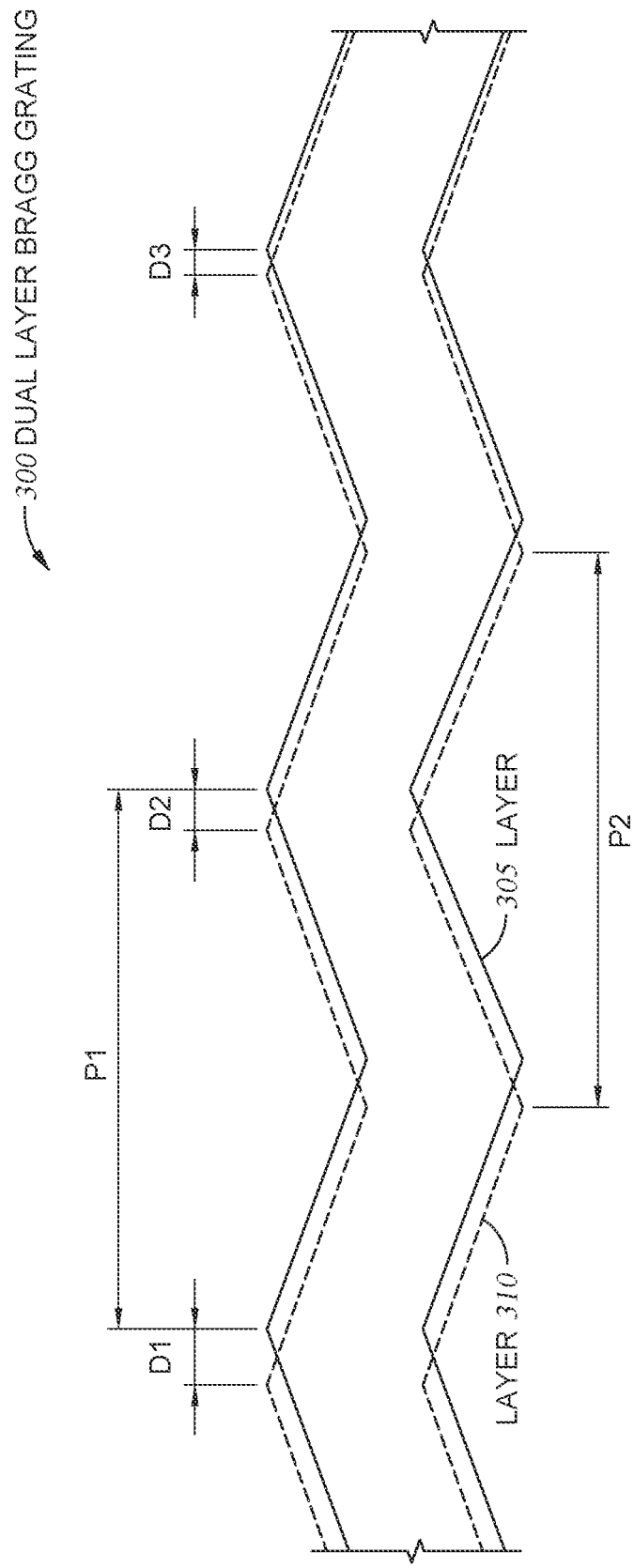
FIG. 3 is a top view of a dual-layer Bragg grating, according to one embodiment.

FIG. 3 is a top view of a dual-layer Bragg grating 300, according to one embodiment. The Bragg grating 300 includes layer 305 and layer 310. The layer 305 is drawn using a solid line while the layer 310 is drawing using a dashed line. In one embodiment, the layer 305 is disposed on the layer 310. That is, the anti-symmetrical structure in the layer 305 at least partially overlaps (or fully overlaps) the anti-symmetrical structure in the layer 310. For clarity, the layer 305 is illustrated as being transparent so that the details of the underlying layer 310 can be seen.

As mentioned above, the pitches P1 and P2 of the layers 305 and 310 are different in order to reflect different bands of a received optical signal. The different pitches results in an offset between the anti-symmetrical structures forming the layers 305 and 310. To illustrate how the different pitches affect the offset distance between the anti-symmetrical structures, FIG. 3 includes distances (D1, D2, and D3) between neighboring peaks in the layers 305 and 310. In this portion of the grating 300, the peaks in the layer 305 lead the peaks in the layer 310. As shown, the distance D1 is larger than the distance D2 which is larger than the distance D3.

If the pattern were continued, the gap between the peaks would start to increase but with the peaks in the layer 310 leading the peaks in the layer 305, rather than peaks in the layer 305 leading as shown in this portion of the grating 300.

Further, while FIG. 3 illustrates the Bragg grating 300 including two layers with the same anti-symmetrical pattern, in other embodiments, the layers could have different anti-symmetrical patterns. For example, the layer 305 could have the zig-zag pattern as shown while the layer 310 may have a saw tooth pattern (or a sinusoidal pattern). In any case, the pitches of the respective layers can be set so that the layers 305, 310 reflect different bands.

FIG. 4 illustrates filtering two bands using a dual-layer Bragg grating, according to one embodiment. FIG. 4 includes a dual passband filter 400 that uses the dual layer Bragg grating 100 to reflect (e.g., filter) two of the bands in a received optical signal.

The filter 400 receives at its input an optical signal that includes four bands: $\lambda 0$, $\lambda 1$, $\lambda 2$, and $\lambda 3$. This optical signal is then received at the Bragg grating 100. As discussed above, the Bragg grating 100 includes two layers with anti-symmetrical structure with separate pitches. In this example, one of the layers has an anti-symmetrical structure with a pitch that reflects the band $\lambda 0$ while the other layer has an anti-symmetrical structure with a pitch that reflects the band $\lambda 2$. Notably, the layers in the Bragg grating 100 are tuned to reflect noncontiguous bands. More specifically, in this example, there is one band (i.e., $\lambda 1$) between the two bands that are reflected by the layers in the Bragg grating 100.

The other bands in the received optical signals are permitted to pass through the Bragg grating 100 without being substantially affected by the anti-symmetrical structures. That is, the bands $\lambda 1$ and $\lambda 3$ can pass through the dual-layer Bragg grating 100. These non-reflected signals are then transmitted to an output 410A of the filter 400.

In contrast, the reflected bands (e.g., $\lambda 0$ and $\lambda 2$) move in a direction back towards the input but are then transferred to a waveguide 415 by an optical mode mux 420. That is, rather than the reflected bands being transmitted back towards the input of the filter 400, the optical mode mux 420 (e.g., an evanescent coupler) redirects the bands to the waveguide 415. This waveguide 415 is in turn coupled to a second output 410B of the filter 400. In this manner, the dual passband filter 400 can separate two bands in a received optical signal from other bands.

Moreover, the Bragg grating 100 includes a first mode transition 405A disposed at one end and a second mode transition 405B disposed at a second, opposite end. In one embodiment, the top layer of the Bragg grating 100 may be coupled to the input waveguide of the dual passband filter 400. As the received optical signal travels from the input to the Bragg grating 100, the mode transition 405A may expand the mode of the received optical signal so it propagates in both layers of the Bragg grating 100. For example, the mode transition 405A may be disposed in the lower layer of the Bragg grating 100 (e.g., the layer of the grating 100 that is not coupled to the input waveguide of the filter 400).

The second mode transition 405B can also be connected to the lower layer of the Bragg grating 100 and can be used to shrink the mode of the optical signal so that it is again primarily confined in the upper layer, which includes the waveguide of the filter 400 that is coupled to the output 410A. Stated differently, the mode transition 405A adjusts the optical mode of the received optical signal so that it is confined in both layers while the mode transition 405B performs the reverse process so that the optical signal (which includes the bands that were not reflected by the Bragg grating 100) is again confined primarily in the upper layer.

Moreover, the mode transition 405A also adjusts the optical mode of the reflected optical signal that includes the bands that were reflected by the Bragg grating 100. As such, the reflected optical signal is primarily confined in the upper layer. That way, this reflected optical signal can be evanescently coupled into the waveguide 415 by the optical mode mux 420.

While the embodiments illustrate a dual-layer Bragg filter, the embodiments herein can include a three or four layer Bragg filter that could be used in a passband filter that separates three or four bands from other bands in a received optical signal. For example, instead of having two layers having anti-symmetrical structures, the Bragg filter may include three layers having anti-symmetrical structures disposed over each other. Further, these three anti-symmetrical structures can have different pitches tuned to reflect different optical bands. For example, if the signal input into the filter 400 includes six bands ($\lambda 0$, $\lambda 1$, $\lambda 2$, $\lambda 3$, $\lambda 4$ and $\lambda 5$), a three-layer Bragg grating could reflect bands $\lambda 0$, $\lambda 2$, and $\lambda 4$ while permitting bands $\lambda 1$, $\lambda 3$, and $\lambda 5$ to pass through. A four-layer Bragg grating could perform a similar function for a received optical signal that includes eight bands. Moreover, a three- or four-layer Bragg grating 100 may include multiple mode transitions at its input and at its output in order to adjust the mode of the optical signal as discussed above.

FIG. 5 illustrates an optical mux/demux 500 that includes at least one dual-layer Bragg grating, according to one embodiment. As shown, the optical mux/demux 500 incorporates the dual passband filter shown in FIG. 4 into the optical mux/demux 500. In general, the optical mux/demux 500 can separate the individual bands in a received optical signal into separate optical signals (which is the function illustrated in FIG. 5) and can receive separate optical signals having different bands and combine them into a signal optical signal, which is the reverse of the function shown in FIG. 5.

Like in FIG. 4, the optical mux/demux 500 receives an optical signal having four bands $\lambda 0$, $\lambda 1$, $\lambda 2$, and $\lambda 3$. The dual-layer Bragg grating 100 reflects two of these bands ($\lambda 0$ and $\lambda 2$) but permits the other two bands ($\lambda 1$ and $\lambda 3$) to pass through.

The bands that pass through the dual-layer Bragg grating 100 are received at a single-layer Bragg grating 505A. Unlike the dual-layer Bragg grating 100, the single-layer Bragg grating 505A has one layer with an anti-symmetrical structure. That is, because the single-layer Bragg grating 505A is tasked with separating two bands, it can use a single anti-symmetrical structure that has a pitch tuned to the band that should be removed. In this example, the single-layer Bragg grating 505A has an anti-symmetrical structure that reflects the band $\lambda 1$ but permits the band $\lambda 3$ to pass through. The band $\lambda 3$ is then output from the optical mux/demux 500.

In one embodiment, the function of the single-layer Bragg grating 505A can be performed by a dual-layer Bragg grating. That is, the single-layer Bragg grating 505A could be replaced by a dual-layer Bragg grating. However, instead of the dual-layer Bragg grating having two anti-symmetrical structures with different pitches (as is the case with the dual-layer Bragg grating 100), the two anti-symmetrical structures in this dual-layer Bragg grating would have the same pitch (i.e., selected to reflect the band $\lambda 1$) and be disposed directly over each other (e.g., directly overlapping so there is no offset between the two anti-symmetrical structures when viewed from the top). That way, the dual-layer Bragg grating would reflect the band $\lambda 1$ while permitting the band $\lambda 3$ to pass through. Thus, it is not necessary to use a single-layer Bragg grating to separate two bands. Put differently, a dual-layer Bragg grating can also be used as a single passband filter.

The band that was reflected by the single-layer Bragg grating 505A (i.e., $\lambda 1$) is then transmitted in a direction back towards the dual-layer Bragg grating 100. However, the optical mux/demux 500 includes an optical mode mux 510A that redirects the optical signal containing the band $\lambda 1$ to a separate output of the mux/demux 500.

Returning to the dual-layer Bragg grating 100, the two bands that were reflected by this grating (i.e., $\lambda 0$ and $\lambda 2$) are redirected by the optical mode mux 420 into a different waveguide that is coupled to another single-layer Bragg grating 505B. Unlike the dual-layer Bragg grating 100, the single-layer Bragg grating 505B has one layer with an anti-symmetrical structure. That is, because the single-layer Bragg grating 505B is tasked with separating two bands, it can use a single anti-symmetrical structure that has a pitch tuned to the band that is to be removed. In this example, the single-layer Bragg grating 505B has an anti-symmetrical structure that reflects the band $\lambda 0$ but permits the band $\lambda 2$ to pass through. The band $\lambda 2$ is then output from the optical mux/demux 500.

In one embodiment, the function of the single-layer Bragg grating 505B can be performed by a dual-layer Bragg grating. That is, the single-layer Bragg grating 505B could be replaced by a dual-layer Bragg grating. As discussed above, instead of the dual-layer Bragg grating having two anti-symmetrical structures with different pitches (as is the case with the dual-layer Bragg grating 100), the two anti-symmetrical structures in this dual-layer Bragg grating would have the same pitch (i.e., selected to reflect the band $\lambda 0$) and be disposed directly over each other (e.g., directly overlapping so there is no offset between the two anti-symmetrical structures when viewed from the top). That way, the dual-layer Bragg grating would reflect the band $\lambda 0$ while permitting the band $\lambda 2$ to pass through. In this manner, a dual-layer Bragg grating can function as a single passband filter.

As shown, the optical mux/demux 500 includes four outputs that can output separate optical signals that each include a respective band. The process can be reversed where the optical mux/demux 500 receives four optical signals each have a different band which are then combined using the Bragg gratings 100, 505A, and 505B to then output an optical signal that includes the four bands at the port that is labeled as the "input" of the optical mux/demux 500.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

In view of the foregoing, the scope of the present disclosure is determined by the claims that follow.

We claim:

1. A Bragg grating, comprising:
   a first layer comprising a first anti-symmetrical structure in a first plane parallel with a top plane with a first pitch, wherein the first layer further comprises an input configured to receive an optical signal at a first end of the Bragg grating; and
   a second layer comprising a second anti-symmetrical structure in a second plane parallel with the top plane with a second pitch that is different than the first pitch, wherein the first layer is disposed between the second layer and the top plane, wherein the second layer further comprises:
   a first mode transition disposed in the second layer at the first end of the second layer; and
   a second mode transition disposed in the second layer at a second end of the second layer opposite the first end of the second layer.

2. The Bragg grating of claim 1, wherein the first anti-symmetrical structure and second anti-symmetrical structure have a sinusoidal pattern.

3. The Bragg grating of claim 1, wherein the first anti-symmetrical structure and second anti-symmetrical structure have a saw tooth pattern.

4. The Bragg grating of claim 1, wherein the first anti-symmetrical structure and second anti-symmetrical structure have a zig-zag pattern.

5. The Bragg grating of claim 1, wherein the first anti-symmetrical structure and second anti-symmetrical structure at least partially overlap.

6. The Bragg grating of claim 1, wherein the optical signal comprises wavelengths in at least three bands, wherein the Bragg grating reflects two of the at least three bands.

7. The Bragg grating of claim 6, wherein the two of the at least three bands reflected by the Bragg grating are noncontiguous bands.

8. The Bragg grating of claim 7, wherein the optical signal comprises wavelengths in at least four bands, wherein the Bragg grating permits two of the at least four bands to pass through.

9. The Bragg grating of claim 8, wherein the two of the at least four bands that pass through the Bragg grating are noncontiguous bands.

10. The Bragg grating of claim 1, further comprising:
    the first mode transition configured to adjust a mode of the received optical signal so that the mode is confined in both the first layer and second layer; and the second mode transition configured to adjust the mode of the received optical signal so that the mode is confined in one waveguide.

11. The Bragg grating of claim 1, wherein the first layer is separated from the second layer by an oxide layer.

12. The Bragg grating of claim 1, wherein the first layer and the second layer are formed from silicon nitride.

13. A photonic chip comprising:
an input waveguide configured to receive an optical signal;
a first layer comprising a first anti-symmetrical structure with a first pitch in a first plane parallel with a top layer in a top plane, wherein the first layer is coupled to the input waveguide, and wherein the first layer receives the optical signal from the input waveguide, and
a second layer parallel with the top layer in the top plane and comprising a second anti-symmetrical structure partially overlapping the first layer, wherein the second layer has a second pitch that is different than the first pitch, and wherein the first and second layers are tuned to reflect different bands contained in the optical signal, wherein the first layer is disposed between the second layer and the top plane, and wherein the second layer further comprises:
a first mode transition disposed in the second layer at a first end of the second layer; and
a second mode transition disposed in the second layer at a second end of the second layer opposite the first end of the second layer.

14. The photonic chip of claim 13, wherein the optical signal comprises wavelengths in at least three bands, wherein the first layer and second layer reflect two of the at least three bands.

15. The photonic chip of claim 14, wherein the two of the at least three bands reflected by the first layer and second layer are noncontiguous bands.

16. The photonic chip of claim 15, wherein the optical signal comprises wavelengths in at least four bands, wherein the first layer and second layer permit two of the at least four bands to pass through.

17. The photonic chip of claim 16, wherein the two of the at least four bands that pass through the first layer and second layer are noncontiguous bands.

18. The photonic chip of claim 13, wherein:
the first mode transition is configured to adjust a mode of the optical signal so that the mode is confined in both the first layer and second layer; and
the second mode transition is configured to adjust the mode of the optical signal so that the mode is confined in one waveguide.

19. The photonic chip of claim 13, wherein the first layer is separated from the second layer by an oxide layer.

20. A passband filter comprising:
an input configured to receive an optical signal comprising at least three bands;
a dual-layer Bragg grating configured to receive the optical signal and reflect at least two of the at least three bands and permit at least one of the at least three bands to pass through;
a first optical coupler disposed between the input and the dual-layer Bragg grating;
a Bragg grating configured to receive the at least two bands reflected by the dual-layer Bragg grating through the first optical coupler, wherein at least one of the at least two bands reflected are permitted to pass through the Bragg grating and at least one of the at least two bands reflected are further reflected, and wherein the Bragg grating is different from the dual-layer Bragg grating;
a second optical coupler disposed between the first optical coupler and the Bragg grating;
a first output configured to output the at least one of the at least two bands reflected that are further reflected through the second optical coupler from the Bragg grating;
a second output configured to output the at least one of the at least two bands permitted to pass through the Bragg grating; and
a third output configured to output the at least one band that passed through the dual-layer Bragg grating.

* * * * *